United States Patent
Wang et al.

(10) Patent No.: US 10,069,545 B2
(45) Date of Patent: Sep. 4, 2018

(54) PRE-CODING SYSTEM AND METHOD BASED ON INTERFERENCE ALIGNMENT

(71) Applicant: ZTE Corporation, Shenzhen (CN)

(72) Inventors: Chaowei Wang, Shenzhen (CN); Nan Li, Shenzhen (CN); Wanfang Zhang, Shenzhen (CN); Cheng Wang, Shenzhen (CN); Xiao Zhang, Shenzhen (CN); Shuai Wang, Shenzhen (CN); Chen Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 54 days.

(21) Appl. No.: 15/102,902

(22) PCT Filed: Jun. 16, 2014

(86) PCT No.: PCT/CN2014/079998
§ 371 (c)(1),
(2) Date: Jun. 9, 2016

(87) PCT Pub. No.: WO2014/180449
PCT Pub. Date: Nov. 13, 2014

(65) Prior Publication Data
US 2016/0308590 A1 Oct. 20, 2016

(30) Foreign Application Priority Data
Dec. 13, 2013 (CN) .......................... 2013 1 0688979

(51) Int. Cl.
*H04B 7/04* (2017.01)
*H04B 7/0452* (2017.01)
(Continued)

(52) U.S. Cl.
CPC ........... *H04B 7/0452* (2013.01); *H04B 7/024* (2013.01); *H04B 7/0456* (2013.01);
(Continued)

(58) Field of Classification Search
CPC .... H04B 7/0452; H04B 7/024; H04B 7/0456; H04B 7/0617; H04B 7/0619;
(Continued)

(56) References Cited

U.S. PATENT DOCUMENTS

| 2010/0227613 A1* | 9/2010 | Kim | ................. H04L 25/03828 455/434 |
| 2013/0078991 A1* | 3/2013 | Nam | ..................... H04B 7/024 455/423 |

(Continued)

FOREIGN PATENT DOCUMENTS

| CN | 102594519 A | 7/2012 |
| CN | 102983949 A | 3/2013 |

(Continued)

OTHER PUBLICATIONS

International Search Report for corresponding application PCT/CN2014/079998 filed Jun. 16, 2014; dated Sep. 19, 2014.

*Primary Examiner* — Walli Butt
(74) *Attorney, Agent, or Firm* — Cantor Colburn LLP

(57) ABSTRACT

Provided is a method for interference alignment applied to a multi-cell and multi-user Multiple Input Multiple Output (MIMO) system. The method includes that: a BS divides multiple users in a cell into a plurality of user groups, and notifies the multiple users of grouping information; and when one of the plurality of user groups is interfered by a neighbor cell, users in the one of the plurality of user groups cooperate with each other to perform interference alignment. The disclosure also provides a pre-coding method and system based on interference alignment. The disclosure, by means of grouping and cooperation of the users and designing of a receiving matrix of each user, achieves the effect of interference alignment in a signal transmission space of the BS.

9 Claims, 3 Drawing Sheets

(51) Int. Cl.
*H04L 25/03* (2006.01)
*H04B 7/024* (2017.01)
*H04B 7/06* (2006.01)
*H04B 7/0456* (2017.01)
*H04L 1/00* (2006.01)
*H04W 72/08* (2009.01)
*H04W 72/00* (2009.01)
*H04L 5/00* (2006.01)
*H04W 88/02* (2009.01)
*H04W 88/08* (2009.01)

(52) U.S. Cl.
CPC ......... *H04B 7/0617* (2013.01); *H04B 7/0619* (2013.01); *H04L 1/0048* (2013.01); *H04L 5/0073* (2013.01); *H04L 25/03343* (2013.01); *H04L 25/03898* (2013.01); *H04W 72/082* (2013.01); *H04L 5/0037* (2013.01); *H04W 72/005* (2013.01); *H04W 88/02* (2013.01); *H04W 88/08* (2013.01)

(58) Field of Classification Search
CPC ................ H04L 1/0048; H04L 5/0073; H04L 25/03343; H04L 25/03898; H04L 5/0037; H04W 72/082; H04W 72/005; H04W 88/02; H04W 88/08
See application file for complete search history.

(56) References Cited

U.S. PATENT DOCUMENTS

| | | | |
|---|---|---|---|
| 2013/0301746 A1* | 11/2013 | Mobasher | H04B 7/0456 375/267 |
| 2015/0009921 A1* | 1/2015 | Papadopoulos | H04L 5/0023 370/329 |

FOREIGN PATENT DOCUMENTS

| | | |
|---|---|---|
| CN | 103167512 A | 6/2013 |
| WO | 2013074830 A1 | 5/2013 |

* cited by examiner

PRE-CODING SYSTEM AND METHOD BASED ON INTERFERENCE ALIGNMENT

TECHNICAL FIELD

The disclosure relates to the field of radio frequencies, and in particular to a pre-coding system and method based on interference alignment.

BACKGROUND

A multi-cell and multi-user Multiple Input Multiple Output (MIMO) system refers to a system composed of a plurality of cells and a plurality of pieces of User Equipment (UE), a Base Station (BS) being located in each cell. In this system, each BS and each UE may include multiple antennae, and each BS simultaneously serves multiple users by using the same frequency resource. Compared with a single-user MIMO system, the multi-user MIMO system may effectively improve the system capacity, is regarded as one of key technologies for the next generation wireless communication accordingly, and gains an attention from a standardizing organization such as a $3^{rd}$ Generation Partnership Project (3GPP).

However, in downlink transmission of the multi-cell and multi-user MIMO system, when a certain BS (transmitter) sends information to users (receiver) in a cell where the BS is located, as a frequency reusing factor of the system is 1, the BS will cause an interference to users in other cells, the interference being an Inter-Cell Interference (ICI); and meanwhile, as the BS simultaneously serves multiple users by using the same frequency resource, an Inter-User Interference (IUI) will exist between multiple users in the cell. The simultaneous existence of the ICI and the IUI causes serious limitations to the performances of the system due to the interference. Thus, an effective interference suppression technology is the object of a prolonged endeavor of each research institute. An interference alignment technology is a novel potential interference suppression mode which has emerged recently, and the technology may greatly improve the system capacity. The interference alignment technology evaluates the system capacity by using a Degree of Freedom (DoF), and the evaluation accuracy is improved with the increase of a Signal Noise Ratio (SNR). The emergence of the interference alignment technology creates a new direction to interference suppression, the interference alignment technology may be applied to a system configured with a single antenna or multiple antennae, the complicated structural design of a terminal is not needed, it is unnecessary to modify a conventional network framework and protocol interface, and inter-cell interference suppression may be realized under the condition that data is not shared by utilizing the channel reciprocity of a Time Division Duplex (TDD) system. Consequently, the interference alignment technology receives a wide attention from all national and international academic institutes and research institutes.

A basic interference alignment idea refers to designing a pre-coding matrix at a transmitter, limiting an interference signal into a specific receiving signal sub-space and reserving another interference-free signal space for data transmission. However, on the basis of the interference alignment technology, the transmitter needs to obtain global Channel State Information (CSI). In the downlink transmission of the multi-user MIMO system, a user may feed CSI of a useful channel and an interference channel back to a BS serving the user via a feedback link, information is shared between the BSs via an X2 interface, and data transmission is performed. In the multi-user MIMO system, an appropriate pre-coding matrix is designed by using the interference alignment technology to eliminate the interference, all users need to feed complete CSI back to all BSs, the CSI is not subjected to any processing, the needed capacity load of the feedback link is heavier, and the spectral efficiency of the system is influenced to a certain extent. Thus, if the interference alignment technology is applied to the multi-cell and multi-user MIMO system, there are a lot of problems needing to be solved in a feedback process that the BS obtains the CSI by feedback.

In a single-user MIMO system having M transmitting-end antennae and N receiving-end antennae, there is only one user in each cell correspondingly, a BS i in a cell i only serves a user in the cell i (at this time, serial numbers of cells, serial numbers of BSs in cells and serial numbers of users in cells are i), and in order to eliminate the interference via the interference alignment technology and transmit a useful signal, it is necessary to satisfy the following two criteria:

$$(R_j)^H H_{ji} T_i = 0, \forall i \neq j \qquad (1)$$

$$\text{rank}((R_j)^H H_{jj} T_j) = d_j \qquad (2)$$

where, $H_{ji}$ represents an N*M-dimension channel matrix (namely CSI) from a transmitter i to a receiver j, $d_j$ is a degree of freedom capable of being obtained by a user j and is less than min(N,M), $R_j$ represents a receiving elimination inference matrix of the receiver j, and $T_j$ represents a transmitting pre-coding matrix of the transmitter i corresponding to the served receiver. Formula 1 represents that the interferences of all interference sources are aligned to the same direction and is eliminated from the receiver j, it is necessary for each transmitter to cooperatively design the transmitting pre-coding matrix in order to align the interferences to the same direction, and when the transmitting pre-coding matrix is designed, the following conditions shall be satisfied: $\text{span}(H_{ji}T_l) = \ldots = \text{span}(H_{jk}T_k) = \ldots = \text{span}(H_{jk}T_k)(j \neq k)$, where span(A) represents a space expanded by a matrix A; and Formula 2 represents that it is necessary to transmit the useful signal by sufficient dimensionalities so as to obtain a DoF desired by a user j. According to the above analysis, it may be seen that the most important thing in the interference alignment technology is that the transmitter needs to know CSI, that is, a channel matrix H, estimated by each receiver.

In an interference alignment research on the single-user MIMO system, the transmitter obtains CSI at a Transmitter (CSIT) in a global CSI feedback mode. FIG. 1 is a diagram of global CSI feedback of a single-user MIMO system.

In the feedback process, suppose each user broadcasts complex coefficients in an own channel matrix H to all interference sources in case of no errors, each user needs to feed N*M elements in the channel matrix back to all (K−1) interference sources, the magnitude thereof is (K−1)*N*M, the feedback information magnitude of the whole system is K*(K−1)*N*M, and the feedback magnitude is calculated only under the condition that each transmitter serves only one receiver; and in the multi-cell and multi-user MIMO system, if each BS may simultaneously serve multiple users, the feedback magnitude will be higher under this circumstance. Thus it may be seen that after the system is applied to the interference alignment technology, a throughput gain capable of being obtained is linearly related to the number of users. However, an overhead brought by feedback is linearly related to the square of the number of users, which may be influenced by the number of cells, the number of cells and the number of transmitter antennae simultaneously in the multi-cell and multi-user MIMO system. Thus, from a global perspective, when the number of users is very large, the performance loss of the system caused by the feedback of the complete CSI overhead of the whole system probably exceeds benefits capable of being obtained in terms of throughput increase.

In the downlink transmission of the multi-user MIMO system, each user only feeds CSI which is not subjected to any processing back to all BSs, and the CSI which is fed back may contain redundant information, which causes that the feedback overhead is higher. In view of that the information fed back by the user contains CSI of a served base station and further includes CSI of a base station causing an interference thereto, and redundancy may be eliminated in a mode of designing a pre-coding matrix by means of the latter. From a user perspective, the disclosure will appropriately group users, establish an appropriate feedback mechanism, and reduce the feedback overhead, thereby practically applying the interference alignment technology to the multi-cell and multi-user MIMO system. To sum up, the disclosure focuses on an interference alignment technology research based on a user grouping feedback mechanism in the downlink transmission of the multi-cell and multi-user MIMO system, wherein the determination of the user grouping feedback mechanism depends on a user cooperation processing policy. It is desired that the system obtains an optimal reusing gain in the multi-user MIMO system by using the interference alignment technology and the problems about the feedback overhead and the resource utilization rate of the system in the interference alignment technology are solved.

On the basis of the above problem analysis, the disclosure will design a CSI feedback mechanism from a perspective of user cooperation processing, and will propose a partial interference alignment solution based on user grouping in the downlink transmission of the multi-cell and multi-user MIMO system. By utilizing the solution, the problem about the feedback overhead of the system caused by application of the interference alignment technology to the downlink transmission of the multi-cell and multi-user MIMO system is solved.

SUMMARY

The disclosure provides a pre-coding method and system based on interference alignment, which are intended to solve the technical problem about the feedback overhead of a system caused by application of an interference alignment technology to the downlink transmission of a multi-cell and multi-user MIMO system.

The technical solution is implemented as follows.

A method for interference alignment, applied to a multi-cell and multi-user MIMO system, may include that:

a BS divides multiple users in a cell into a plurality of user groups, and notifies the multiple users of grouping information; and when one of the plurality of user group is interfered by a neighbor cell, users in the one of the plurality of user groups cooperate with each other to perform interference alignment.

Preferably, the step that the users in the user group cooperate with each other to perform interference alignment may specifically include that:

the users in the user group cooperatively design respective receiving processing matrixes in accordance with an interference alignment criterion, such that all users in the group align interferences from the same neighbor cell to one or more identical interference sub-spaces.

Preferably, the step that when the user group is interfered by the neighbor cell, the users in the user group cooperate with each other to perform interference alignment may specifically include that:

the users judge whether the interferences from the same neighbor cell are strong interferences, and if so, the users in the user group cooperate with each other to perform interference alignment.

Preferably, when the users in the user group cooperatively design the respective receiving processing matrixes, the following interference alignment criterion may be followed:

$$\mathrm{span}\{(H_m^{[1,G,l]})^H R^{[1,G,l]}\} = \ldots = \mathrm{span}\{(H_m^{[k,G,l]})^H R^{[k,G,l]}\} = \ldots = \mathrm{span}\{(H_m^{[K',G,l]})^H R^{[K',G,l]}\} = H_{[(G,l),m]}^{\mathit{effectiveICI}},$$

where $H_m^{[k,G,l]}$ represents an interference channel for a user k in a user group G in a cell 1 from a cell m, K' represents the number of users in each user group, and $H_{[(G,l),m]}^{\mathit{effectiveICI}}$ represents an aligned equivalent interference channel for all users in a user group [G, 1] from the cell m.

Preferably, when the BS divides the multiple users in the cell into the plurality of user groups, one or more of factors may be considered, the factors including:

geographic areas where users are located, resource scheduling and resource allocation.

A pre-coding method based on interference alignment, applied to a multi-cell and multi-user MIMO system, may include that:

a BS divides multiple users in a cell into a plurality of user groups, and notifies the users of grouping information;

when a user group is interfered by a neighbor cell, users in the user group cooperate with each other to perform interference alignment;

the users report useful channel information to a BS serving the users and report interference space information to a BS of the neighbor cell from which the interference comes; and the BSs pre-code for the users according to the useful channel information and the interference space information reported by the users.

Preferably, the step that the users in the user group cooperate with each other to perform interference alignment may specifically include that:

the users in the user group cooperatively design respective receiving processing matrixes in accordance with an interference alignment criterion, such that all users in the group align interferences from the same neighbor cell to one or more identical interference sub-spaces.

Preferably, the step that when the user group is interfered by the neighbor cell, the users in the user group cooperate with each other to perform interference alignment may specifically include that:

the users judge whether the interferences from the same neighbor cell are strong interferences, and if so, the users in the user group cooperate with each other to perform interference alignment.

Preferably, when the users in each user group cooperatively design the respective receiving processing matrixes, the following interference alignment criterion may be followed:

$$\mathrm{span}\{(H_m^{[1,G,l]})^H R^{[1,G,l]}\} = \ldots = \mathrm{span}\{(H_m^{[k,G,l]})^H R^{[k,G,l]}\} = \ldots = \mathrm{span}\{(H_m^{[K',G,l]})^H R^{[K',G,l]}\} = H_{[(G,l),m]}^{\mathit{effectiveICI}},$$

where $H_m^{[k,G,l]}$ represents an interference channel for a user k in a user group G in a cell l from a cell m, K' represents the number of users in each user group, and $H_{[(G,l),m]}^{\mathit{effectiveICI}}$ represents an aligned equivalent interference channel for all users in a user group [G, 1] from the cell m.

Preferably, when the BS divides multiple users in the cell into the plurality of user groups, one or more of factors may be considered, the factors including:

geographic areas where users are located, resource scheduling and resource allocation.

Preferably, the useful channel information reported by the users may be obtained by performing reduced rank processing on channel information of the users.

A UE may include:

a negotiation component configured to negotiate with other UEs in a same user group in terms of intercommunity information; and an interference alignment component configured to cooperate, when a user group is interfered by a neighbor cell, with other users in the group via the negotiation component to perform interference alignment.

Preferably, the UE may further include:

an interference detection component configured to notify, when a user is interfered by a neighbor cell, the negotiation component and the interference alignment component to negotiate with other users in the user group to perform interference alignment.

Preferably, the operation that the users in the user group cooperate with each other to perform interference alignment may specifically include that:

the users in the user group cooperatively design respective receiving processing matrixes in accordance with an interference alignment criterion, such that all users in the group align interferences from the same neighbor cell to one or more identical interference sub-spaces.

A BS may include:

a user grouping component configured to divide multiple users in a cell into a plurality of user groups and notify the users of grouping information;

a user feedback receiving component configured to receive useful channel information and interference space information fed back by users in each user group; and a pre-coding component configured to pre-code for the users according to the useful channel information and the interference space information received by the user feedback receiving component.

A pre-coding system based on interference alignment may include a UE group and a BS, wherein the BS is configured to divide multiple users in a cell into a plurality of user groups, notify the users of grouping information, receive useful channel information and interference space information fed back by users in each user group and pre-code the users; and the UE group includes a plurality of UEs and is configured to enable, when a user group is interfered by a neighbor cell, users in the user group to cooperate with each other to perform interference alignment, report useful channel information to a BS serving the UEs and report interference space information to a BS serving the neighbor cell from which interference comes, wherein user groups are not cooperative in an interference alignment process.

The disclosure has the beneficial effects as follows.

1) By means of grouping and cooperation of users and designing of a receiving matrix of each user, the effect of interference alignment in a signal transmission space of the BS is achieved.

2) By performing reduced rank processing and redundancy elimination processing on complete CSI at each user and designing a feedback mechanism, the feedback amount of each user is decreased, thereby reducing the feedback overhead of the system.

3) A transmitting pre-coding matrix is designed for users served by the BS at the BS according to the channel information and the interference information obtained by feedback, and the aim of eliminating strong interferences to users in other cells and IUIs in this cell is achieved.

4) In a grouping and cooperation process of users, interferences from a certain cell to the users in other cells are aligned to multiple sub-spaces, the BS in each cell only eliminates the strong interferences to the users in other cells, the requirement for the number of transmitting antennae at the BSs and the requirement for the number of receiving antennae at the users are reduced, and therefore the hardware implementation complexity of the BSs and the users may be reduced.

DETAILED DESCRIPTION OF THE EMBODIMENTS

Method Embodiment

Figure 5:
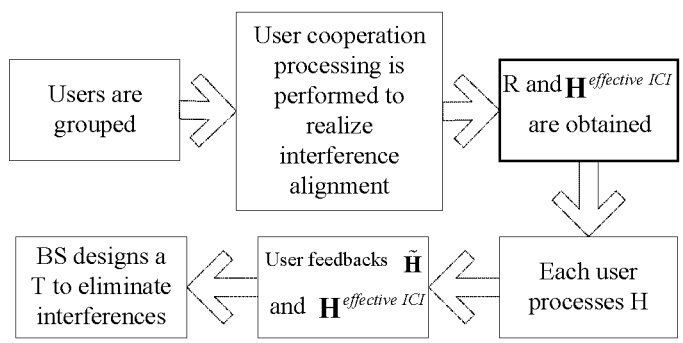
FIG. 5 is an implementation flow diagram according to an embodiment of the disclosure.

In an embodiment of the disclosure, a partial interference alignment solution based on user cooperation processing is proposed. In order to solve the problems that the number of antennae at BSs and users is largely required in a conventional interference alignment solution in a multi-cell and multi-user system scene, as shown in FIG. 5, users in each cell are grouped firstly. Users falling within the same user group in the disclosure cooperatively design a receiving matrix, thereby reducing the redundancy of feedback CSI of each user and reducing the requirement for feedback overhead of a system. Meanwhile, each user only needs to feed CSI subjected to redundancy elimination back to a BS serving the user, thereby realizing local feedback. In view of that each BS cannot design a pre-coding matrix only according to redundancy-eliminated channel information to achieve the aim of interference elimination. In the embodiment, some users need to feed equivalent interference information back simultaneously, and the equivalent interference information is obtained by user cooperation processing and may be shared between the BSs via an X2 interface. Thus, different from a conventional interference alignment solution for a multi-cell and multi-user system in which each user feeds all pieces of unprocessed CSI back, the solution is characterized in that each user feeds processed useful CSI and equivalent interference information back. As aligned interference directions of different user groups are different in a user cooperation process in the solution, a plurality of interference directions of users in a neighbor cell with respect to a certain cell are aligned to several main interference directions, so that the solution proposed by the disclosure is the partial interference alignment solution based on user cooperation processing.

Under a considered multi-cell and multi-user MIMO network structure, suppose the number of antennae of a BS is M, the number of antennae of users is N, and the number of desired data streams of each user is $d_s$, signals received by a user k (expressed as a user [k, l] hereinafter) in a cell 1 is:

$$\tilde{y}^{[k,l]} = (R^{[k,l]})^H \left( \sum_{m=1}^{L} H_m^{[k,l]} \sum_{j=1}^{K} x^{[j,m]} + n^{[k,l]} \right) \quad (3)$$

$$= \underbrace{(R^{[k,l]})^H H_l^{[k,l]} T^{[k,l]} s^{[k,l]}}_{desired\ signal} + \underbrace{(R^{[k,l]})^H H_l^{[k,l]} \sum_{j=1,j\neq k}^{K} T^{[j,l]} s^{[j,l]}}_{IUI} +$$

$$\underbrace{(R^{[k,l]}) \sum_{m=1,m\neq l}^{L} \sum_{j=1}^{K} H_m^{[k,l]} T_m^{[j,m]} s^{[j,m]} + \tilde{n}^{[k,l]}}_{ICI}$$

where $x^{[k,l]}=T^{[k,l]}s^{[k,l]}$ is a signal transmitted to the user [k, 1] and satisfies $E[\|x^{[k,l]}\|^2] \leq P^{[k,l]}$ ($P^{[k,l]}$ is a transmission power allocated to the user [k, 1] and supposed to be an inter-user average allocation power); and $s^{[k,l]}=[s_1^{[k,l]}, s_2^{[k,l]}, \ldots, s_{d_s}^{[k,l]}]^T$ represents a data vector (namely a transmission data vector of the user [k, 1]) transmitted to the user k by a BS in the cell 1 and satisfies power limitations (namely the transmission powers of all data streams are equal), a dimensionality thereof being $d_s*1$. $T^{[k,l]}=[t_1^{[k,l]}, t_2^{[k,l]}, \ldots, t_{d_s}^{[k,l]}]$ represents a linear transmission pre-coding matrix of the data vector $s^{[k,l]}$, a matrix dimensionality being $M*d_s$; and $t_1^{[k,l]}$ represents a linear transmission vector of a data symbol $s_1^{[k,l]}$ in $s^{[k,l]}$ and satisfies $\|t_1^{[k,l]}\|=1$, vector dimension being $M*1$. $H_m^{[k,l]}$ is a channel from an $m^{th}$ BS to the user [k, 1], a matrix dimensionality being $N*M$; and $n^{[k,l]}$ is a white Gaussian noise vector of which a mean value at the user [k, 1] is 0 and a variance is $\sigma^2$. $R^{[k,l]}=[r_1^{[k,l]}, r_2^{[k,l]}]$ represents a receiving de-precoding matrix of the user [k, 1], a dimensionality being $N*d_s$; and $\tilde{n}^{[k,l]}=R^{[k,l]}n^{[k,l]}$ is an equivalent noise, obeying complex Gaussian distribution CN(0,1).

If it is necessary to eliminate the IUI and the ICI in the multi-cell and multi-user MIMO system by utilizing the interference alignment technology, the design of pre-coding matrixes at a receiver and a transmitter shall satisfy Formula (4):

$$(R^{[k,l]})^H H_m^{[k,l]} T^{[j,m]}=0, \forall m \neq l, j \in \{1,2,\ldots,K\}$$

$$(R^{[k,l]})^H H_l^{[k,l]} T^{[j,l]}=0, \forall k \neq j, j \in \{1,2,\ldots,K\}$$

$$\text{rank}\{(R^{[k,l]})^H H_l^{[k,l]} T^{[k,l]}\}=d_s \quad (4)$$

DoF is one of key indexes for measuring the performances of a multi-antenna system under a high SNR, which is defined as shown in Formula (5):

$$d \triangleq \lim_{SNR \to \infty} \frac{C_\Sigma(SNR)}{\log(SNR)} = \sum_{l=1}^{L} \sum_{k=1}^{K} d^{[k,l]} \quad (5)$$

where $C_\Sigma(SNR)$ is a sum capacity of the system under a given SNR and $$C_\Sigma(SNR) = \sum_{l=1}^{L} \sum_{k=1}^{K} C^{[k,l]},$$

and $C^{[k,l]}$ is a capacity capable of being obtained by the user [k, 1].

In an interference alignment design criterion (4), a conventional interference alignment implementation solution of the multi-user MIMO system such as a minimum interference leakage solution and a maximum signal to interference plus noise ratio preferentially designs a transmitting pre-coding matrix T according to unprocessed CSI, such that a plurality of interferences from a neighbor cell are aligned to an identical direction (or sub-space) in a receiving signal space of each user, and then a receiving matrix R of each user is designed to eliminate aligned interferences. In these solutions, the feedback overhead of the CSI is very high. Thus, in the disclosure, in order to reduce the requirement for the number of antennae at the receiver/transmitter, users are grouped, and partial interferences are aligned; and then, the receiving matrix R of the users is preferentially designed in a user cooperation processing mode to reduce the feedback amount. The method is called the partial interference alignment solution based on user cooperation processing, which specifically includes the steps as follows:

1) Users in each cell are grouped in accordance with a certain criterion, and the user grouping criterion may refer to dividing the users according to geographic areas where the users are located, or with reference to modes of resource scheduling, resource allocation and the like. The users are notified of a user grouping mode and result by a BS in the cell where the users are located.

2) Users in each user group cooperatively design respective receiving processing matrixes in accordance with an interference alignment criterion, and users in the same group align strong interferences from the same neighbor cell to an identical interference sub-space. The users cooperatively design the respective receiving processing matrixes by following a criterion as shown in Formula (6):

$$\text{span}\{(H_m^{[1,G,l]})^H R^{[1,G,l]}\}=\ldots=\text{span}\{(H_m^{[k,G,l]})^H R^{[k,G,l]}\}=\ldots=\text{span}\{(H_m^{[K',G,l]})^H R^{[K',G,l]}\}=H_{[(G,l),m]}^{effectiveICI} \quad (6)$$

where $H_m^{[k,G,l]}$ represents an interference channel for a user k in a user group G (expressed as a user group [G, 1]) in a cell 1 from a cell m, K' represents the number of users in each user group, and $H_{[(G,l),m]}^{effectiveICI}$ represents an aligned equivalent interference channel for all users in the user group [G, 1] from the cell m.

In the step, all users in each cell do not need to align all interferences from the neighbor cell to the identical interference sub-space (completely), and users in each user group align strong interferences from a certain cell to the identical interference sub-space instead (partially), so that the requirement for the number of antennae at the receiver/transmitter may be reduced.

3) After obtaining the respective receiving processing matrix, each user performs reduced rank processing on a channel matrix H to be fed back to a BS in a cell serving same, and the processed channel matrix is fed back to the BS serving same.

An H reduced rank processing criterion is:

$$\tilde{H}=R^H H \quad (7)$$

Meanwhile, interference information (int erference_inf ormation) is designed as:

$$\text{int erference\_inf ormation}=H^{effectiveICI} \quad (8)$$

where H is an N*M-dimension channel matrix, R is an N*$d_s$-dimension user receiving matrix, and $A^H$ represents complex conjugate transposition operation on a matrix A. After processing of Formula (7) is performed, $\tilde{H}$ is a $d_s$*M-dimension matrix. As $d_s$ is less than min(N,M), compared with CSI H which is not subjected to any processing, the dimensionality of $\tilde{H}$ is reduced, so that the feedback amount of each user may be decreased, and the influence on N in the feedback magnitude (K−1)*N*M of each user is eliminated. Meanwhile, each user only feeds redundancy-eliminated $\tilde{H}$ back to a BS serving same, and only some users need to feed interference information back. Thus, the influence on the number of users in the feedback magnitude of the system may be reduced.

4) Each user group feeds an aligned interference sub-space corresponding to a certain neighbor cell in Step 2) back to a BS of the corresponding neighbor cell in a certain mode. By means of processing in Step 3) and Step 4), the feedback overhead of the system may be reduced.

5) The BS in each cell designs a transmitting pre-coding matrix for users in this cell in accordance with a certain criterion according to a channel matrix and an equivalent interference sub-space obtained by feedback, thereby achieving the aim of eliminating IUIs and ICIs in the cells.

The BS in each cell 1 designs the transmitting pre-coding matrix for users in this cell by taking Formula 9 as a criterion, an IUI in this cell is eliminated, and interferences to users in a neighbor cell are eliminated.

$$T^{[k,l]} \subset \text{null}\left(\left\{\underbrace{H^{effectiveICI}_{[(G,m),l],m \neq l}}_{interference\_information}, \underbrace{[(R^{[t(t \neq k),l]})^H * H_l^{[t(t \neq k),l]}]^H}_{effectiveIUIchannels}\right\}\right) \quad (9)$$

In the method provided by the disclosure, the number M of transmitting antennae at each BS, the number N of receiving antennae at each user, the number K of users in each cell, the number L of cells and the number $d_s$ of desired data streams of each user satisfy a relationship:

$$M \geq (K+6)d_s$$

$$N \geq \lceil (K-5/K')*d_s \rceil \quad (10)$$

In the solution, the number M of the transmitting antennae at each BS and the number N of the receiving antennae at each user shall satisfy a relationship:

$$N \geq \lceil [(K'-1)*M+d_s]/K' \rceil \quad (11)$$

With reference to Formula (10) and Formula (11), in the solution, the number of the receiving antennae at each user shall satisfy:

$$N \geq \max(\lceil [(K'-1)*M+d_s]/K' \rceil, \lceil (K-5/K')*d_s \rceil) \quad (12)$$

In Formula (10), Formula (11) and Formula (12), K' is the number of users in each user group, and K' is less than K. In some conventional interference alignment solutions, the number M of the transmitting antennae at each BS, the number N of the receiving antennae at each user (suppose each user has an equal number of receiving antennae), the number K of the users in each cell (suppose each cell has an equal number of users), the number L of the cells and the number $d_s$ of the desired data streams of each user satisfy a relationship:

$$M \geq [K(L-1)+1]d_s$$

$$N \geq [(K-1)(L-1)+1]d_s \quad (13)$$

From Formula (13), it can be seen that the number of the receiving antennae at each user and the number of transmitter antennae at each BS are increased with the product of the number of the cells and the number of the users in each cell. When the number of the cells or the number of the users is relatively large, the requirement for the number of antennae is large. Thus, the hardware implementation complexity at either the users or the BSs is relatively high.

By comparing Formula (10) and Formula (13), it may be seen that in the solution proposed by the disclosure, the requirements for the number M of the transmitting antennae at each BS and the number N of the receiving antennae at each user have no relationship with the number of the cells. Thus, the disclosure may effectively reduce the requirements for the number of receiver and transmitter antennae, thereby reducing the implementation complexity at the BSs and the users.

Figure 1:
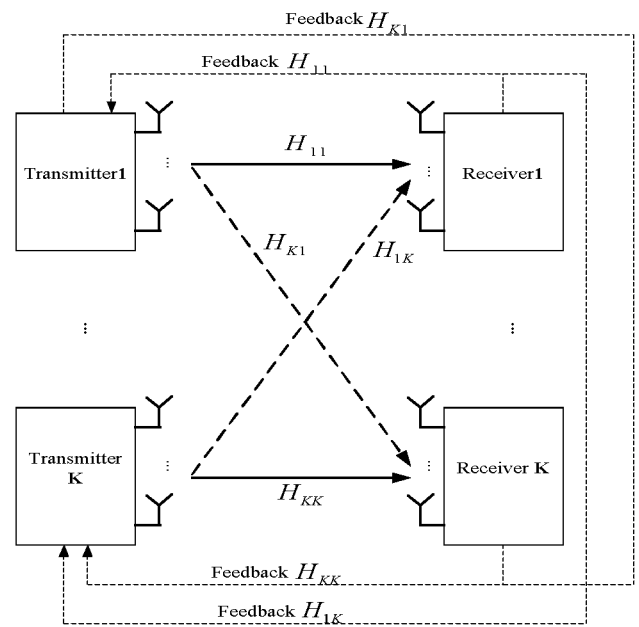
FIG. 1 is a diagram of global CSI feedback in a single-user MIMO system (peer-to-peer MIMO)
Figure 2:
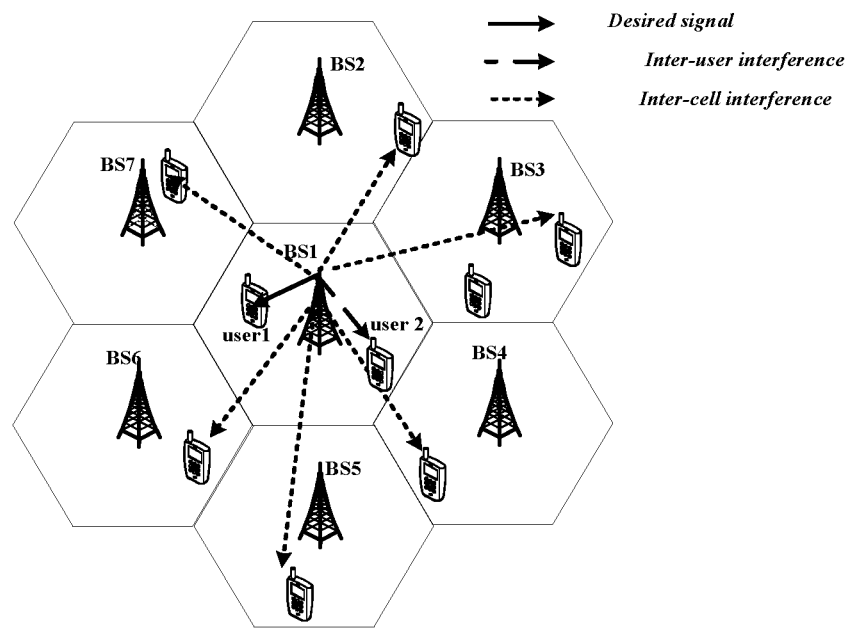
FIG. 2 is a mimic diagram of a multi-cell and multi-user MIMO system according to an embodiment of the disclosure.

The embodiment takes K users in each of 7 cells as an example for illustrations; and the number of antennae at a BS is M, the number of antennae at each user is N, the number of desired data streams of each user is $d_s$, and the power of the BS in each cell is averagely allocated. FIG. 2 shows a system model diagram.

Figure 3:
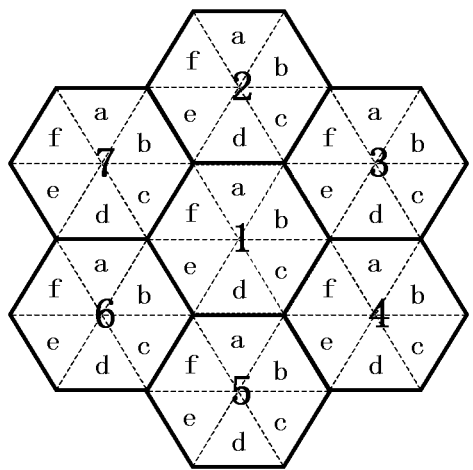
FIG. 3 is a diagram of grouping of users in each cell in a multi-cell and multi-user MIMO system according to an embodiment of the disclosure.

1: In the embodiment, a user grouping mode of Step 1 in a partial interference alignment method is shown in FIG. 3. Users in each cell are divided into 6 user groups according to areas where the users are located, and a user group G in a cell m is represented by [G, m], where G∈{a,b,c,d,e,f}, m∈{1,2,3, . . . , 7}. Thus, neighbor cells, namely a cell 2, a cell 3, a cell 4, a cell 5, a cell 6 and a cell 7, cause strong interferences to users in user groups [a,1], [b,1], [c,1], [d,1], [e,1] and [f,1], and the analysis of strong interferences to users in each user group in other cells is similar to that of a cell 1. Users in each user group cooperatively design a receiving matrix and align strong interferences from the same neighbor cell. For example, all users in the user group [a,1] cooperatively design respective receiving matrixes to align interferences from the cell 2, and only some users (users in the user group [a,1]) among all users (an assembly of users in six user groups) in the cell 1 align the interferences of the cell 2, namely partial interference alignment described in the disclosure is performed. In the solution, suppose the number of users in each user group is identical and equal to K', the total number K of users in each cell is equal to 6K'.

2: In accordance with user cooperation processing in each user group in Step 2, the respective receiving matrixes R are designed. In order to describe a user cooperation process in detail, the cell 1 is illustrated, and the implementation process of each user group in other cells is similar to that of each user group in the cell 1.

Users in each user group in the cell 1 cooperate with each other to design the respective receiving matrixes R, and users in different user groups do not cooperate. $R^{[k,G,l]}$ represents a receiving matrix of a user k in a user group [G, 1], and the design of $R^{[k,G,l]}$ satisfies a criterion:

$$\text{span}\{(H_m^{[1,G,1]})^H R^{[1,G,1]}\} = \ldots = \text{span}\{(H_m^{[k,G,1]})^H R^{[k,G,1]}\} = \ldots = \text{span}\{(H_m^{[K',G,1]})^H R^{[K',G,1]}\} = H_{[(G,1),m]}^{effectiveICI} \quad (14)$$

where $(G, m) \in \{(a,2), (b,3), (c,4), (d,5), (e,6), (f,7)\}$; $H_m^{[k,G,1]}$ represents an interference channel for the user k in the user group [G, 1] from a cell m; and $H_{[(G,1),m]}^{effectiveICI}$ represents an aligned effective ICI channel (equivalent interference information) for all users in the user group [G, 1] from the cell m, the size thereof being $M*d_s$. By solving a matrix equation contained in Formula (6), a receiving matrix $R^{[k,G,1]}$ of the user k in the user group [G, 1] may be obtained, and $H_{[(G,1),m]}^{effectiveICI}$ may be obtained.

Figure 4:
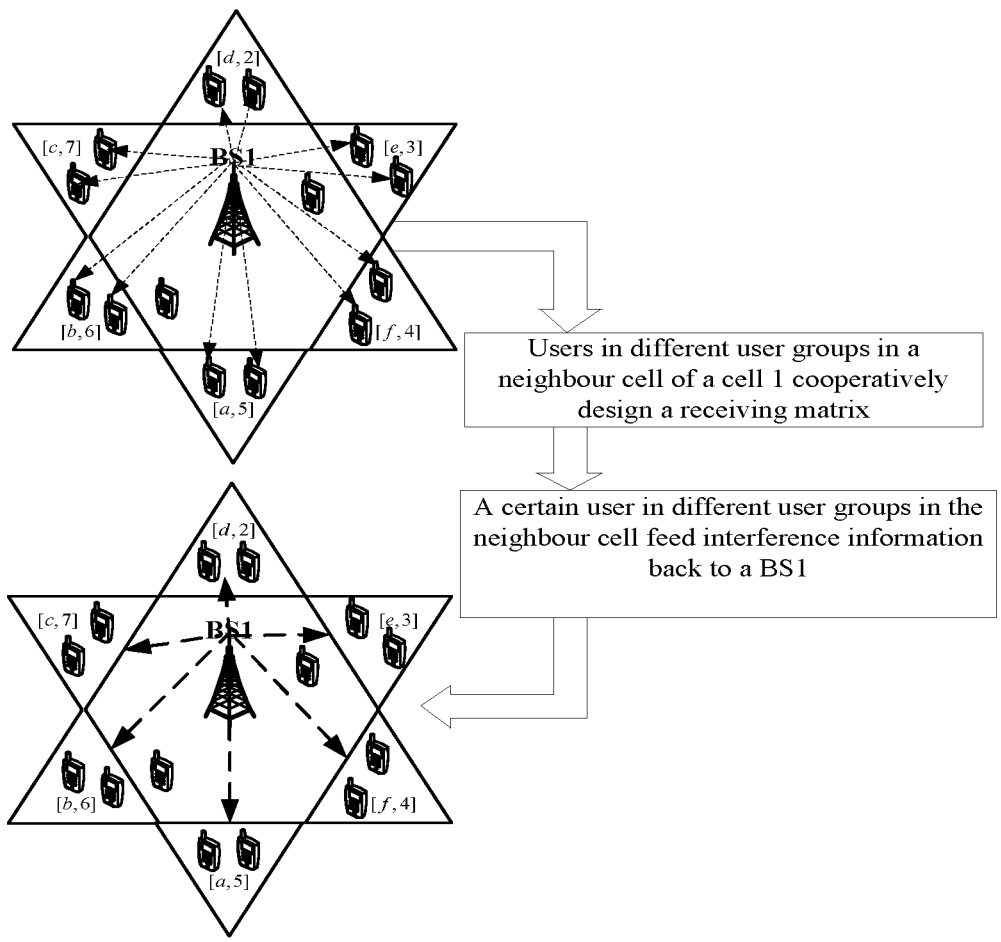
FIG. 4 is a diagram of a partial interference alignment effect according to an embodiment of the disclosure.

3: In Step 3 and Step 4, users in the cell 1 process a channel matrix H between the users and a BS in a serving cell by taking Formula (7) as a criterion, and feed H̃ obtained by processing back to the BS serving same. Meanwhile, the BS in the cell 1 obtains interference sub-spaces $H_{[(G,m),1]}^{effectiveICI}$ of corresponding user groups in six neighbor cells. After the BS obtains each interference sub-space $H_{[(G,m),1]}^{effectiveICI}$, interferences to K directions (sub-spaces) of K users in a user group [G, m] from the BS in the cell 1 originally are aligned to a sub-space now. The interferences to all users in six neighbor cells are aligned to six main directions. FIG. 4 shows a user cooperation process and a partial interference alignment process.

In FIG. 4, strong interferences from the BS in the cell 1 to the users (users in user groups [d, 2], [e, 3], [f, 4], [a, 5], [b, 6] and [c, 7]) in the six neighbor cells are aligned to six different sub-spaces by different user groups respectively, and original 6K interference directions are aligned to six interference sub-spaces (each interference sub-space corresponds to a user group strongly interfered by the cell 1 in a neighbor cell) from the BS in the cell 1.

4: By utilizing interference information $H^{effectiveICI}$ obtained in the step and a receiving de-precoding matrix $R^{[k,l]}$ of each user, in the step, a transmitting pre-coding matrix T is designed for each user served thereby at the BS of each cell. Moreover, different from a conventional solution for eliminating all pieces of ICI, the solution is characterized in that each cell only eliminates strong interferences to users in other cells, and other interferences which are relatively weak are not processed. The cell 1 is still illustrated.

When the BS in the cell 1 designs a transmitting pre-coding matrix $T^{[k,1]}$ for users, a followed criterion is:

$$T^{[k,l]} \subset \text{null}\left\{\begin{pmatrix} \underbrace{H_{[(d,2),1]}^{effectiveICI} H_{[(e,3),1]}^{effectiveICI} H_{[(f,4),1]}^{effectiveICI}}_{interference\_information} & \underbrace{\begin{bmatrix}(R^{[t(t \neq k),1]})^H \\ H_1^{[t(t \neq k),1]}\end{bmatrix}^H}_{effectiveIUIchannels} \\ \underbrace{H_{[(a,5),1]}^{effectiveICI} H_{[(b,6),1]}^{effectiveICI} H_{[(c,7),1]}^{effectiveICI}}_{interference\_information} & \end{pmatrix}^H\right\} \quad (15)$$

$T^{[k,1]}$ is orthogonal to a space formed by interference information $H_{[(G,m(m \neq 1),1)]}^{effectiveICI}$ and an effective IUI channel, so that when the BS in the cell 1 sends information to a user k, interferences to other users in this cell during sending of the information to the user k may be eliminated, and strong interferences to users in neighbor cells may also be eliminated. When BSs in other cells design a transmitting pre-coding matrix for each user in this cell, the BSs and the BS in the cell 1 follow the same rule.

From a feedback overhead perspective, the disclosure analyzes the problem existing in a conventional interference alignment solution in the multi-cell and multi-user MIMO system. A partial interference alignment policy based on user cooperation processing is proposed. Two factors of reducing the feedback overhead and reducing the requirements for the number of antennae at the receiver and the transmitter are comprehensively considered in the policy, so that the interference alignment technology may be practically applied to the multi-cell and multi-user MIMO system, and the performances of the system are improved.

In another embodiment of the disclosure, a pre-coding system based on interference alignment corresponding to the method embodiment is provided, which includes:

a BS configured to divide multiple users in a cell into a plurality of user groups, notify the users of grouping information, receive useful channel information and interference space information fed back by users in each user group and pre-code the users; and a UE group including a plurality of UEs and configured to enable, when a user group is interfered by a neighbor cell, users in the user group to cooperate with each other to perform interference alignment, report useful channel information to a BS serving same and report interference space information to a BS of the neighbor cell interfering same, the user groups being not cooperative in an interference alignment process.

The above embodiments describe the technical solutions of the disclosure in detail. It shall be understood that the above is only the embodiments of the disclosure and is not intended to limit the protection scope of the disclosure. Any modifications, equivalent replacements, improvements and the like made within the spirit and principle of the disclosure shall fall within the protection scope of the disclosure.

INDUSTRIAL APPLICABILITY

As above, the pre-coding system and method based on interference alignment provided by the embodiments of the disclosure have the beneficial effects as follows. By means of grouping and cooperation of users and designing of a receiving matrix of each user, the effect of interference alignment in a signal transmission space of the BS is achieved; by performing reduced rank processing and redundancy elimination processing on complete CSI at each user and designing a feedback mechanism, the feedback amount of each user is decreased, thereby reducing the feedback overhead of the system; a transmitting pre-coding matrix is designed for users served by the BS at the BS according to the channel information and the interference information obtained by feedback, and the aim of eliminating strong interferences to users in other cells and IUIs in this cell is achieved; and in a grouping and cooperation process of users, interferences from a certain cell to the users in other cells are aligned to multiple sub-spaces, the BS in each cell only eliminates the strong interferences to the users in other cells, the requirement for the number of transmitting antennae at the BSs and the requirement for the number of receiving antennae at the users are reduced, and therefore the hardware implementation complexity of the BSs and the users may be reduced.

What is claimed is:

1. A method for interference alignment, applied to a multi-cell and multi-user Multiple Input Multiple Output (MIMO) system, the method comprising:
dividing, by a Base Station (BS), multiple users in a cell into a plurality of user groups, and notifying the multiple users of grouping information respectively; and
enabling, when one of the plurality of user groups is interfered by a neighbour cell, users in the one of the plurality of user groups to cooperate with each other to perform interference alignment, wherein enabling the users in the one of the plurality of user groups to cooperate with each other to perform the interference alignment comprises: cooperatively designing, by the users in the one of the plurality of user groups, respective receiving processing matrixes in accordance with a partial interference alignment criterion to enable all users in the one of the plurality of groups to align strong interference signals from the same neighbour cell to one or more identical interference sub-spaces, wherein the strong interference signals comprise signals that interfere with data transmission.

2. The method according to claim 1, wherein
enabling, when the one of the plurality of user groups is interfered by the neighbour cell, the users in the one of the plurality of user groups to cooperate with each other to perform the interference alignment comprises:
judging, by the users, whether the interferences from the same neighbour cell are the strong interference signals, and if the interferences from the same neighbour cell are the strong interference signals, enabling the users in the one of the plurality of user groups to cooperate with each other to perform the interference alignment.

3. The method according to claim 1, wherein
when the users in the one of the plurality of user groups cooperatively design the respective receiving processing matrixes, the following interference alignment criterion is followed:

$$\mathrm{span}\{(H_m^{[1,G,l]})^H R^{[1,G,l]}\} = \ldots = \mathrm{span}\{(H_m^{[k,G,l]})^H R^{[k,G,l]}\} = \ldots = \mathrm{span}\{(H_m^{[K',G,l]})^H R^{[K',G,l]}\} = H_{[(G,l),m]}^{\mathit{effectiveICI}},$$

where $H_m^{[k,G,l]}$ represents an interference channel, from a cell m, for a user k in a user group G in a cell 1, K' represents the number of users in each user group, and $H_{[(G,l),m]}^{\mathit{effectiveICI}}$ represents an aligned equivalent interference channel, from the cell m, for all users in a user group [G, 1].

4. The method according to claim 1, wherein
the BS divides the multiple users in the cell into the plurality of user groups according to one or more of the following factors:
geographic areas where users are located, resource scheduling and resource allocation.

5. A pre-coding method based on interference alignment, applied to a multi-cell and multi-user Multiple Input Multiple Output (MIMO) system, the method comprising:
dividing, by a Base Station (BS), multiple users in a cell into a plurality of user groups, and notifying the multiple users of grouping information respectively;
enabling, when one of the plurality of user groups is interfered by a neighbour cell, users in the one of the plurality of user groups to cooperate with each other to perform the interference alignment;
reporting, by the users, useful channel information to the BS serving the users, and reporting interference space information to a BS of the neighbour cell from which the interfering comes; and
respectively pre-coding, by the BS, for the users according to the useful channel information and the interference space information reported by the users wherein enabling the users in the one of the plurality of user groups to cooperate with each other to perform interference alignment comprises: cooperatively designing, by the users in the one of the plurality of user groups, respective receiving processing matrixes in accordance with a partial interference alignment criterion to enable all users in the one of the plurality of user groups to align interferences from the same neighbour cell to one or more identical interference sub-spaces, wherein the useful channel information comprises information about a channel with relatively low signal interference that is operative to transmit data.

6. The method according to claim 5, wherein
enabling, when the one of the plurality of the user groups is interfered by the neighbour cell, the users in the one of the plurality of user groups to cooperate with each other to perform interference alignment comprises:
judging, by the users, whether the interferences from the same neighbour cell are strong interference signals, and if the interferences from the same neighbour cell are strong interference signals, enabling the users in the user group to cooperate with each other to perform interference alignment.

7. The method according to claim 5, wherein
when the users in the one of the multiple user groups cooperatively design the respective receiving processing matrixes, the following interference alignment criterion is followed:

$$\mathrm{span}\{(H_m^{[1,G,l]})^H R^{[1,G,l]}\} = \ldots = \mathrm{span}\{(H_m^{[k,G,l]})^H R^{[k,G,l]}\} = \ldots = \mathrm{span}\{(H_m^{[K',G,l]})^H R^{[K',G,l]}\} = H_{[(G,l),m]}^{\mathit{effectiveICI}},$$

where $H_m^{[k,G,l]}$ represents an interference channel, from a cell m, for a user k in a user group G in a cell 1, K' represents the number of users in each user group, and $H_{[(G,l),m]}^{\mathit{effectiveICI}}$ represents an aligned equivalent interference channel, from the cell m, for all users in a user group [G,1].

8. The method according to claim 5, wherein
the BS divides the multiple users in the cell into the plurality of user groups according to one or more of the following factors:
geographic areas where users are located, resource scheduling and resource allocation.

9. The method according to claim 5, wherein
the useful channel information reported by the users is obtained by performing reduced rank processing on channel information of the users.

* * * * *